United States Patent
Plasek et al.

(10) Patent No.: US 9,189,511 B2
(45) Date of Patent: Nov. 17, 2015

(54) FREE RESOURCES PARAMETER FOR IMPROVING PERFORMANCE OF DATABASE ALTERATIONS

(75) Inventors: James M. Plasek, Shoreview, MN (US); Michael S. Jende, White Bear Lake, MN (US); Ronald H. Menzhuber, New Brighton, MN (US); Jennifer J. Smith, Eden Prairie, MN (US)

(73) Assignee: Unisys Corporation, Blue Bell, PA (US)

( * ) Notice: Subject to any disclaimer, the term of this patent is extended or adjusted under 35 U.S.C. 154(b) by 141 days.

(21) Appl. No.: 13/226,539

(22) Filed: Sep. 7, 2011

(65) Prior Publication Data
US 2013/0060732 A1  Mar. 7, 2013

(51) Int. Cl.
*G06F 17/30* (2006.01)

(52) U.S. Cl.
CPC ................. *G06F 17/30348* (2013.01)

(58) Field of Classification Search
CPC .................................................. G06F 17/30348
See application file for complete search history.

(56) References Cited

U.S. PATENT DOCUMENTS

| | | | | |
|---|---|---|---|---|
| 5,408,653 | A | * | 4/1995 | Josten et al. ............... 1/1 |
| 5,551,046 | A | * | 8/1996 | Mohan et al. .............. 1/1 |
| 5,557,792 | A | * | 9/1996 | Josten et al. ............... 1/1 |
| 5,581,753 | A | * | 12/1996 | Terry et al. ................ 1/1 |
| 5,761,660 | A | * | 6/1998 | Josten et al. ............ 707/613 |
| 6,374,243 | B1 | * | 4/2002 | Kobayashi et al. ....... 707/703 |
| 6,732,360 | B1 | * | 5/2004 | Seo et al. ............... 719/310 |
| 6,917,931 | B2 | * | 7/2005 | Minder et al. .............. 1/1 |
| 7,036,124 | B1 | * | 4/2006 | Patterson ................. 718/104 |
| 7,315,850 | B2 | * | 1/2008 | Minder et al. ............ 707/770 |
| 7,739,252 | B2 | * | 6/2010 | Kumar et al. ............. 707/704 |
| 7,937,384 | B2 | * | 5/2011 | Minder et al. ............ 707/713 |
| 8,301,607 | B2 | * | 10/2012 | Kaijima et al. ........... 707/702 |
| 2003/0004930 | A1 | * | 1/2003 | Minder et al. ............ 707/2 |
| 2005/0015353 | A1 | * | 1/2005 | Kumar et al. ............ 707/1 |
| 2005/0234947 | A1 | * | 10/2005 | Minder et al. ............ 707/100 |
| 2008/0037571 | A1 | * | 2/2008 | Hetzel et al. ............. 370/408 |
| 2008/0065593 | A1 | * | 3/2008 | Minder et al. ............ 707/2 |
| 2008/0209525 | A1 | * | 8/2008 | Ben-Shoshan ............ 726/4 |
| 2011/0053508 | A1 | * | 3/2011 | Hirose .................... 455/41.2 |
| 2012/0216062 | A1 | * | 8/2012 | Araki ..................... 713/323 |

FOREIGN PATENT DOCUMENTS

JP  2000-172543  *  6/2000

OTHER PUBLICATIONS

Machine Translation of JP 2000-172543.*

* cited by examiner

*Primary Examiner* — James Trujillo
*Assistant Examiner* — Hubert Cheung
(74) *Attorney, Agent, or Firm* — Richard J. Gregson (57) ABSTRACT

Altering tables in a database system may be difficult because the tables may only be altered when all connection to the tables have been released. A free resources parameter may be set on in a management system for the database system to specify that resources should be attempted to be released. Connections to the database may be closed earlier than conventionally closed. For example, connections that are idle may be released. Once the connections have been released the database may be altered and the free resources parameter turned off. The free resources parameter notifies the database system of a pending alteration and allows the database to gracefully close connections to provide an opportunity for the alteration to occur.

20 Claims, 5 Drawing Sheets

FREE RESOURCES PARAMETER FOR IMPROVING PERFORMANCE OF DATABASE ALTERATIONS

TECHNICAL FIELD

The instant disclosure relates to databases. More specifically, the instant disclosure relates to updates of database structures.

BACKGROUND

Database systems allow for storage of and rapid access to large sets of information. Database systems have become an important part of organizing information within companies. Additionally, database systems have made available large amounts of information, such as news stories, through web sites on the Internet. Data in a database system may be selected and fetched through query statements executed by the database system. After a query is executed, a set of data is returned to the requester, if the data is available. For example, in a database system storing patient records a query may be of the type: "find all drugs patient X is allergic to."

Database systems may be accessed by multiple users through multiple interfaces. For example, the database system storing patient information may be accessible to medical personnel inside the hospital, patients from their home, and medical insurance companies. Each of these users access the database through an interface, such as a Java database connector (JDBC). When the user requests data from the database system, the interface establishes a database connection and retrieves the data from the database. However, the interface does not conventionally close the database connection immediately after the data is downloaded.

Database connections are often left open to improve the performance of later requests for data from the database system. By leaving the database connection open, the overhead of establishing the database connection is eliminated in future data requests. Database connections are instead closed after a specified amount of time or after the connection has been idle for a certain period of time. For example, the connection may be closed after twenty minutes.

Changes to the structure of the database system may not be performed while database connections to the database system are open. For example, if a database system administrator desires to add a new column for phone number to a table listing patients in the database system, the database system administrator is unable to add the column until all database connections are closed. When large numbers of users are accessing a database system, such as in a hospital, there are only rare moments when no database connections are open. For example, the database system may wait one or more days to execute an alteration waiting for database connections to close.

One conventional solution to allow administrators to alter the database system is to shut down the database system. When the database system is shut down all database connections are closed. Then, the administrator may alter the database system. However, shutting down the database system makes data unavailable to users. In certain scenarios, such as a hospital, data must be made available 24 hours per day and 365 days per year. Additionally, restarting the database system may not be as simple as turning the database system back on. Errors may occur from the shut down and re-start creating additional delay time in making the database system available again. Further, the staff responsible for shutting down and restarting the database system is often part of a different organization than the staff responsible for designing and altering the database system.

SUMMARY

According to one embodiment, a method includes establishing at least one database connection with a user. The method also includes receiving a request to access resources in a database through at least one database connection. The method also includes receiving a request to free the resources in the database. The method further includes attempting to free the resources after receiving the request to free the resources.

According to another embodiment, a computer program product includes a non-transitory computer readable medium having code to establish at least one database connection with a user. The medium also includes code to receive a request to access resources in a database through at least one database connection. The medium also includes code to receive a request to free the resources in the database. The medium further includes code to attempt to free the resources after receiving the request to free the resources.

According to a further embodiment, a system includes a processor coupled to a memory, in which the processor is configured to establish at least one database connection with a user. The processor is also configured to receive a request to access resources in a database through at least one database connection. The processor is also configured to receive a request to free the resources in the database. The processor is further configured to attempt to free the resources after receiving the request to free the resources.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

According to one embodiment of the disclosure, the database system may be made available for alterations by setting a free resource parameter in the database system instructing the database system to release resources opened by database connections. When the free resource parameter is set, the database system may respond to queries to the database system through database connections, but shortly thereafter release the resources in the database system accessed through the database connection. As a result, accessing the database system may be less efficient because users accessing resources of the database system may have additional overhead in establishing new database connections. However, when database connections from users are closed more rapidly as a result of the free resource parameter being set, alterations to the database may occur faster because the database connections do not persist as long. Further, the free resource parameter reduces the down-time of a database system by reducing the number of or eliminate the need for shut-downs of the database system for database alterations.

Although the following embodiments describe databases and database connections, the embodiments may be applied to any shared changeable resource. For example, the embodiments may be applied to connections to servers, connections to blade servers, connections to sockets, and/or pipes to other systems or resources.

Figure 1:
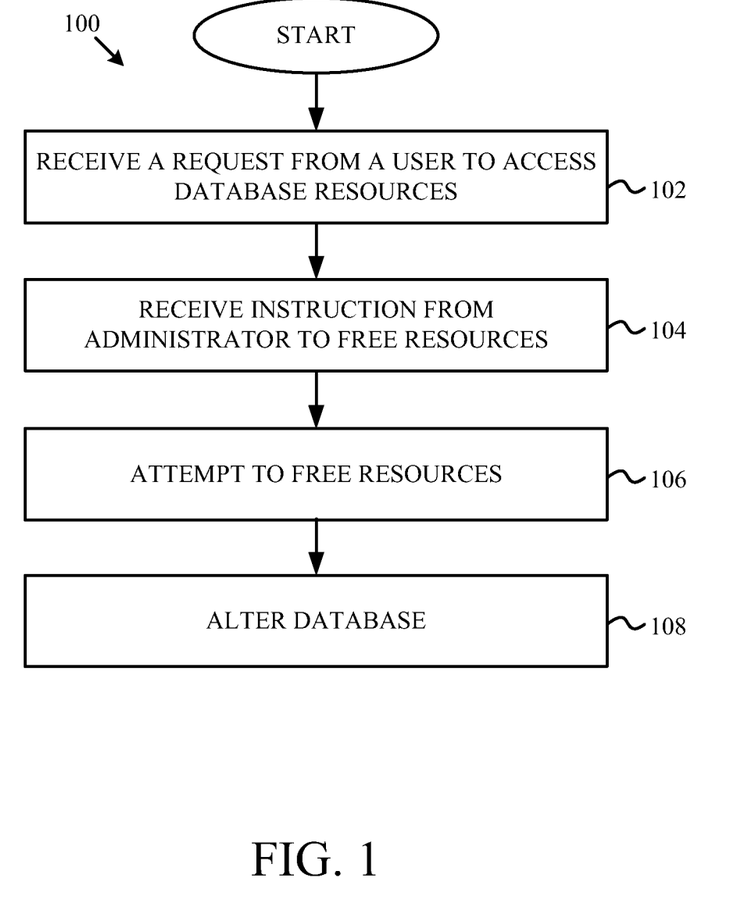
FIG. 1 is a flow chart illustrating an exemplary method of altering databases with use of a free resource parameter in a database system according to one embodiment of the disclosure.

FIG. 1 is a flow chart illustrating an exemplary method of altering databases with use of a free resource parameter in a database system according to one embodiment of the disclosure. A method 100 begins at block 102 with a database system receiving a request from a user to access database resources. The request may be established through a database connector or an interface such as, for example, a JBOSS server, a Websphere server, and/or a java database connector (JDBC).

At block 104 instructions are received at the database system to free resources. The instruction may be, for example, to set a free resources parameter to 'YES.' The free resource parameter may be set at anytime by an administrator. For example, the free resources parameter may be modified whether or not database connections are currently open to the database system. The free resources parameter may be a dynamic system reconfiguration (DSR) parameter.

At block 106 the database system attempts to free resources. For example, the database system may close database connections earlier than conventionally performed when the free resource parameter is set to 'NO.' According to one embodiment, resources may be freed after a commit command and/or a rollback command terminates threads in a database connection. In another embodiment, the resources in a database system may be released before a commit operation. Conventionally, resources may not be freed until an end thread command is issued. According to one embodiment, a particular resource may not be released if the resource is explicitly locked or used by a cursor. When the particular resource is not released the release may occur at a later time when the last cursor is dropped. In another embodiment, the database system does not hold definitions associated with the database connections.

The resources to be freed may be, for example relational description tables (RDTs), a file relation description tables (FRDTs), and/or a file description tables (FDTs). A RDT may be an encoded, machine-readable form of a relational table definition that corresponds to information stored in symbolic form in a repository for user reports. A FDT may be a run-time definition for a storage area that corresponds to the characteristics described in a repository storage area definition. A FRDT may be a table connecting another table of the database system with version information, which may be automatically created by a database management system.

At block 108 the database may be altered after the resources have been freed at block 106. Thus, the database is altered without shutting down the database system. Additionally, the alteration may be completed within a certain period of time rather than waiting for a random opportunity when all resources are free. According to one embodiment, the resources may be freed and the database system available for altering within approximately the amount of time set for database connections to automatically close. For example, the resources may be freed within twenty minutes rather than one or more days.

According to one embodiment, the alterations may be, for example adding a column to a table, creating an index, dropping an index, and/or processing storage-area updates. When processing a request to add a column to table, setting the free resource parameter increases the likelihood that the database system will obtain exclusive access to the RDT of the database system to add the column, because the database system will attempt to close database connections. When processing a request to create and/or drop an index, setting the free resource parameter increases the likelihood that exclusive access is obtained to the RDT of the database system. When processing a request for processing storage-area updates, setting the free resource parameter increases the likelihood that the database system will obtain exclusive access to the FDT allowing an increase in the number of pages in the storage-area.

After the database is altered users may be notified of the database alteration. For example, a user may have a prepared statement stored by a JDBC for accessing a database system, in which the prepared statement is stored as a section with associated meta-data. A section may be, for example, an interface packet or a parameter set for accessing a database or other resource. The prepared statement may be any statement that lends itself to utilizing the method being defined and claimed in the patent. According to one embodiment, the statement may be a select, insert, update, or delete statement, but the methods described regarding prepared statements is not necessarily limited to those statements alone.

When the database is altered, the meta-data may become out-of-date. As a result, the JDBC should be instructed to re-parse the prepared statement to create a new section with corrected meta-data. The database system may inform the JDBC with a newly-defined error message. When the JDBC attempts to execute the section after the database alteration, an error message is returned to the JDBC indicating that the database has been altered. Such an error message was previously unnecessary because the database was not altered while database connections were open.

Figure 2:
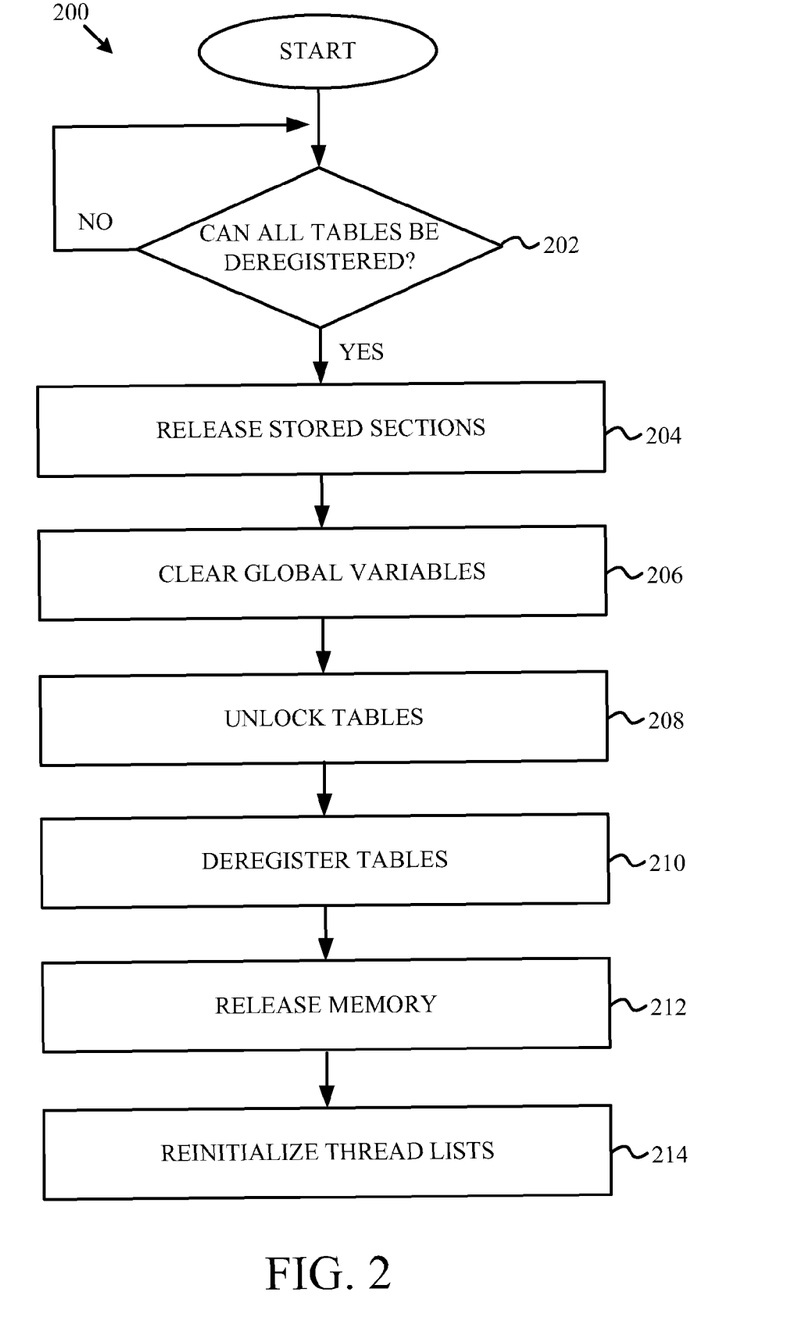
FIG. 2 is a flow chart illustrating an exemplary algorithm for deregistering tables in a database system according to one embodiment of the disclosure.

A database connection to a relational database management system (RDMS) may result in registering a thread in the database system with a RDT or a FDT. Deregistering of the tables, such as the RDT, FRDT, and FDT, may occur when the free resources parameter is set. FIG. 2 is a flow chart illustrating an exemplary algorithm for deregistering tables in a database system according to one embodiment of the disclosure. A method 200 begins at block 202 with determining if all tables may be deregistered. Tables may not be deregistered, for example, when there is a cursor, an explicit lock, a runtime packet, or a dropped table in the database system. According to one embodiment if not all tables may be deregistered the algorithm waits at block 202 until all tables may be deregistered. At block 204 all stored sections are released to prevent sections from pointing to tables that have been released. Additionally, stored procedures may be released. At block 206 global variables pointing to the tables are cleared. At block 208 the FDTs may be unlocked. According to one embodiment, the FDT may already be unlocked, such as in a concurrent application group.

At block 210 the tables are deregistered. According to one embodiment, FDTs may be deregistered first, followed by FRDTs, and then the RDTs. At block 212 the memory associated with the tables is released. At block 214 the thread lists of the tables are reinitialized.

Figure 3:
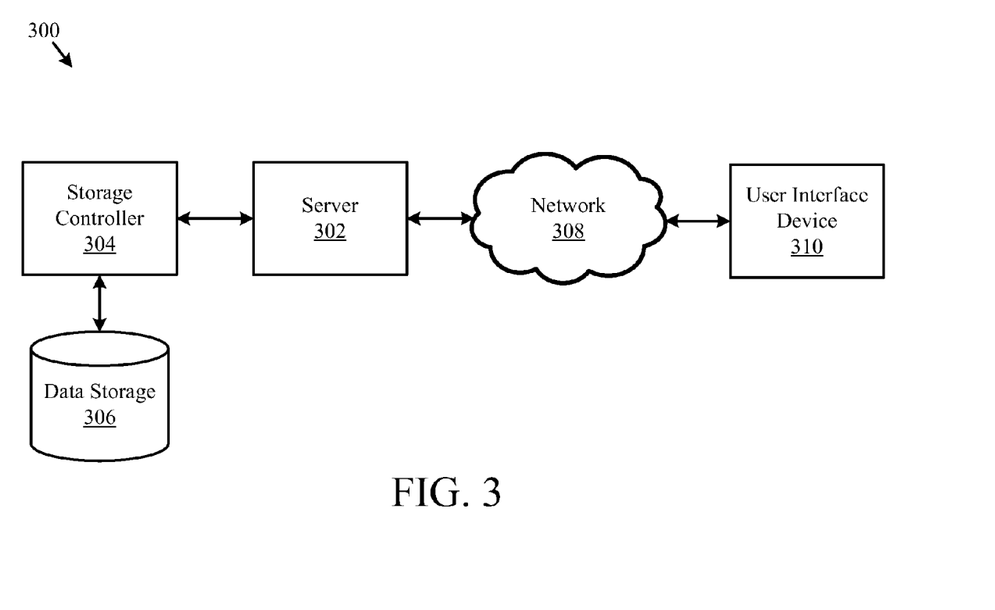
FIG. 3 is block diagram illustrating a data management system configured to store databases, tables, and/or records according to one embodiment of the disclosure.

FIG. 3 illustrates one embodiment of a system 300 for an information system. The system 300 may include a server 302, a data storage device 306, a network 308, and a user interface device 310. The server 302 may be a dedicated server or one server in a cloud computing system. In a further embodiment, the system 300 may include a storage controller 304, or storage server configured to manage data communications between the data storage device 306, and the server 302 or other components in communication with the network 308. In an alternative embodiment, the storage controller 304 may be coupled to the network 308.

In one embodiment, the user interface device 310 is referred to broadly and is intended to encompass a suitable processor-based device such as a desktop computer, a laptop computer, a personal digital assistant (PDA) or table computer, a smartphone or other a mobile communication device or organizer device having access to the network 308. In a further embodiment, the user interface device 310 may access the Internet or other wide area or local area network to access a web application or web service hosted by the server 302 and provide a user interface for enabling a user to enter or receive information.

The network 308 may facilitate communications of data between the server 302 and the user interface device 310. The network 308 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate, one with another.

In one embodiment, the user interface device 310 accesses the server 302 through an intermediate sever (not shown). For example, in a cloud application the user interface device 310 may access an application server. The application server fulfills requests from the user interface device 310 by accessing a database management system (DBMS). In this embodiment, the user interface device 310 may be a computer executing a Java application making requests to a JBOSS server executing on a Linux server, which fulfills the requests by accessing a relational database management system (RDMS) on a mainframe server.

In one embodiment, the server 302 is configured to store databases, pages, tables, and/or records. For example, the server 302 may store news stories or patient histories. Additionally, scripts on the server 302 may access data stored in the data storage device 306 via a storage area network (SAN) connection, a LAN, and/or a data bus. The data storage device 306 may include a hard disk, including hard disks arranged in an redundant array of independent disks (RAID) array, a tape storage drive comprising a physical or virtual magnetic tape data storage device, an optical storage device, or the like. The data may be arranged in a database and accessible through structured query language (SQL) queries, or other data base query languages or operations.

Figure 4:
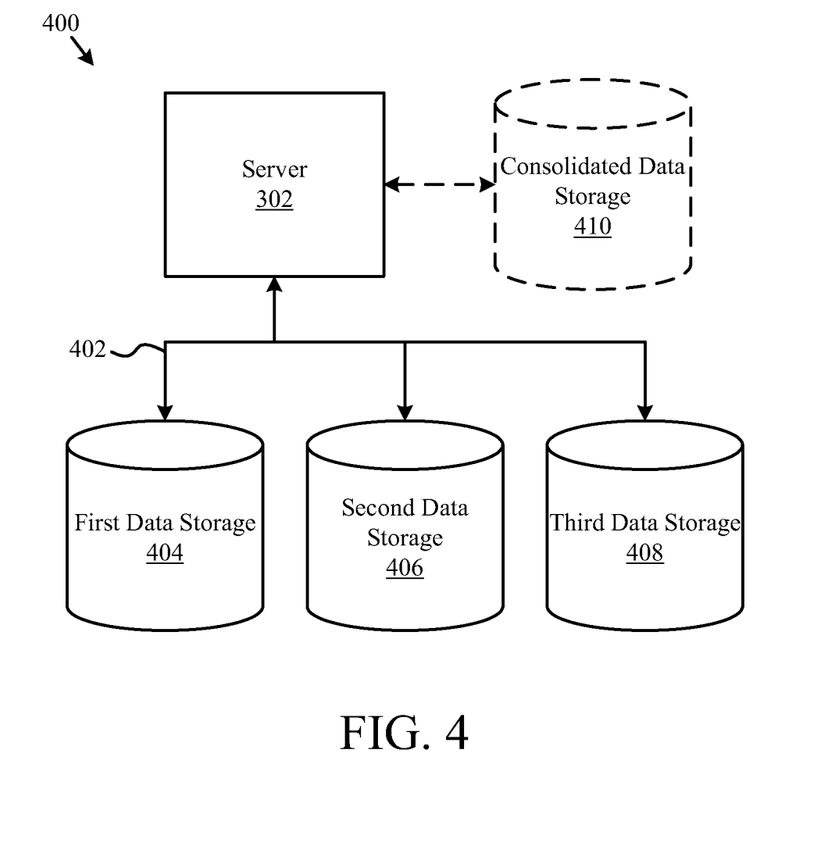
FIG. 4 is a block diagram illustrating a data storage system according to one embodiment of the disclosure.

FIG. 4 illustrates one embodiment of a data management system 400 configured to store measured data from a sensor network. In one embodiment, the data management system 400 may include the server 302. The server 302 may be coupled to a data-bus 402. In one embodiment, the data management system 400 may also include a first data storage device 404, a second data storage device 406, and/or a third data storage device 408. In further embodiments, the data management system 400 may include additional data storage devices (not shown). In such an embodiment, each data storage device 404, 406, and 408 may each host a separate database that may, in conjunction with the other databases, contain redundant data. Alternatively, a database may be spread across storage devices 404, 406, and 408 using database partitioning or some other mechanism. Alternatively, the storage devices 404, 406, and 408 may be arranged in a RAID configuration for storing a database or databases through may contain redundant data. Data may be stored in the storage devices 404, 406, 408, 410 in a database management system (DBMS), a relational database management system (RDMS), an indexed sequential access method (ISAM) database, a multi sequential access method (MSAM) database, a conference on data systems languages (CODASYL) database, or other database system.

In one embodiment, the server 302 may submit a query to select data from the storage devices 404 and 406. The server 302 may store consolidated data sets in a consolidated data storage device 410. In such an embodiment, the server 302 may refer back to the consolidated data storage device 410 to obtain a set of records. Alternatively, the server 302 may query each of the data storage devices 404, 406, and 408 independently or in a distributed query to obtain the set of data elements. In another alternative embodiment, multiple databases may be stored on a single consolidated data storage device 410.

In various embodiments, the server 302 may communicate with the data storage devices 404, 406, and 408 over the data-bus 402. The data-bus 402 may comprise a storage area network (SAN) and/or a local area network (LAN). The communication infrastructure may include Ethernet, fibre-channel arbitrated loop (FC-AL), fibre-channel over Ethernet (FCoE), small computer system interface (SCSI), internet small computer system interface (iSCSI), serial advanced technology attachment (SATA), advanced technology attachment (ATA), cloud attached storage, and/or other similar data communication schemes associated with data storage and communication. For example, the server 302 may communicate indirectly with the data storage devices 404, 406, 408, and 410 by first communicating with a storage server (not shown) or the storage controller 304.

The server 302 may include modules for interfacing with the data storage devices 404, 406, 408, and 410, interfacing a network 308 and/or interfacing with a user through the user interface device 310. In a further embodiment, the server 302 may host an engine, application plug-in, or application programming interface (API) or a database interface such as a java database connector (JDBC).

Figure 5:
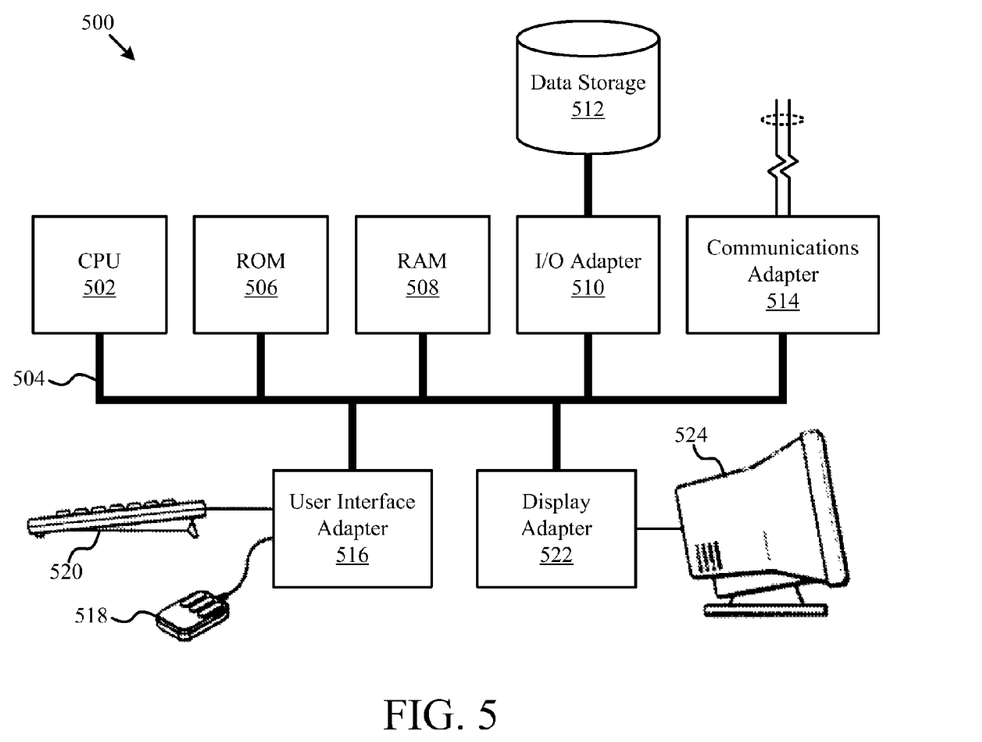
FIG. 5 is a block diagram illustrating a computer system according to one embodiment of the disclosure.

FIG. 5 illustrates a computer system 500 adapted according to certain embodiments of the server 302 and/or the user interface device 310. The central processing unit ("CPU") 502 is coupled to the system bus 504. The CPU 502 may be a general purpose CPU or microprocessor, graphics processing unit ("GPU"), and/or microcontroller. The present embodiments are not restricted by the architecture of the CPU 502 so long as the CPU 502, whether directly or indirectly, supports the modules and operations as described herein. The CPU 502 may execute the various logical instructions according to the present embodiments.

The computer system 500 also may include random access memory (RAM) 508, which may be SRAM, DRAM, and/or SDRAM. The computer system 500 may utilize RAM 508 to store the various data structures used by a software application such as databases, tables, and/or records. The computer system 500 may also include read only memory (ROM) 506 which may be PROM, EPROM, EEPROM, or optical storage. The ROM may store configuration information for booting the computer system 500. The RAM 508 and the ROM 506 hold user and system data.

The computer system 500 may also include an input/output (I/O) adapter 510, a communications adapter 514, a user interface adapter 516, and a display adapter 522. The I/O adapter 510 and/or the user interface adapter 516 may, in certain embodiments, enable a user to interact with the computer system 500. In a further embodiment, the display adapter 522 may display a graphical user interface associated with a software or web-based application on a display device 524, such as a monitor or touch screen.

The I/O adapter 510 may connect one or more storage devices 512, such as one or more of a hard drive, a compact disc (CD) drive, a floppy disk drive, and a tape drive, to the computer system 500. The communications adapter 514 may be adapted to couple the computer system 500 to the network 308, which may be one or more of a LAN, WAN, and/or the Internet. The communications adapter 514 may be adapted to couple the computer system 500 to a storage device 512. The user interface adapter 516 couples user input devices, such as a keyboard 520, a pointing device 518, and/or a touch screen (not shown) to the computer system 500. The display adapter 522 may be driven by the CPU 502 to control the display on the display device 524.

The applications of the present disclosure are not limited to the architecture of computer system 500. Rather the computer system 500 is provided as an example of one type of computing device that may be adapted to perform the functions of a server 302 and/or the user interface device 310. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although embodiments describe the JDBC database interface, other interfaces such as object linking and embedding database (OLE/DB), open database connector (ODBC), ActiveX data object for .NET (ADO.NET), SPARQL, and other database interface technologies may implement the disclosure of this application. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer implemented method for updating database structures in a computing system, the computer implemented method comprising:

establishing at least one database connection with a user;

setting a free resources parameter to initiate the release of database connections, wherein the free resources parameter corresponds to a dynamic system reconfiguration parameter;

releasing the at least one database connection based on the free resources parameter by releasing the at least one database connection more rapidly when the free resources parameter is set than when the free resources parameter is not set, wherein the releasing of the at least one database connection occurs prior to the execution of an end thread command;

updating the database without shutting down the database after the at least one database connection is released and while the free resources parameter is set; and unsetting the free resource parameters after the database has been updated.

2. The computer implemented method of claim 1, further comprising:

discarding database definitions corresponding to each of the at least one database connection when each of the at least one database connection is released.

3. The computer implemented method of claim 2, further comprising altering the database after each of at least one database connection is released.

4. The computer implemented method of claim 1, further comprising receiving a request to access resources, wherein the request to access the resources is received through an interface comprising at least one of a JBOSS server, a Websphere server, a java database connector (JDBC), an object linking and embedding database (OLE/DB) connector, an open database connector (ODBC), an ActiveX Data Object for .NET (ADO.NET) connector, and a SPARQL connector.

5. The computer implemented method of claim 4, further comprising receiving a request to free the resources in the database, wherein the request to free the resources in the database is received from a database administrator.

6. The computer implemented method of claim 4, in which the resources are released when at least one of a commit and rollback command are completed for the resources.

7. The computer implemented method of claim 4, in which the resources comprise at least one of a relational description table (RDT), a file relation description table (FRDT), and a file description table (FDT).

8. The computer implemented method of claim 7, further comprising deregistering the resources after at least one of a cursor, an explicit lock, a runtime packet, and a dropped table is cleared in the database.

9. A computer program product comprising non-transitory computer readable memory containing encoded data representing instructions that when executed causes a programmable computing system to implement a method for updating database structures in a computing system, the computer program product comprising:
a non-transitory computer readable medium comprising:
code to establish at least one database connection with a user;
code to set a free resources parameter to initiate the release of database connections, wherein the free resources parameter corresponds to a dynamic system reconfiguration parameter;
code to release the at least one database connection based on the free resources parameter by releasing the at least one database connection more rapidly when the free resources parameter is set than when the free resources parameter is not set, wherein the releasing of the at least one database connection occurs prior to the execution of an end thread command;
code to update the database without shutting down the database after the at least one database connection is released and while the free resources parameter is set; and
code to unset the free resources parameter after the database has been updated.

10. The computer program product of claim 9, in which the non-transitory computer readable medium further comprises:
code to discard database definitions corresponding to each of the at least one database connection when each of the at least one database connection is released.

11. The computer program product of claim 10, in which the non-transitory computer readable medium further comprises code to alter the database after each of at least one database connection is released.

12. The computer program product of claim 9, in which the non-transitory computer readable medium further comprises code to receive a request to access resources, wherein the request to access the resources is received through an interface comprising at least one of a JBOSS server, a Websphere server, a java database connector (JDBC), an object linking and embedding database (OLE/DB) connector, an open database connector (ODBC), an ActiveX Data Object for .NET (ADO.NET) connector, and a SPARQL connector.

13. The computer program product of claim 12, in which the resources comprise at least one of a relational description table (RDT), a file relation description table (FRDT), and a file description table (FDT).

14. The computer program product of claim 13, in which the non-transitory computer readable medium further comprises code to deregister the resources after at least one of a cursor, an explicit lock, a runtime packet, and a dropped table is cleared in the database.

15. A computing system for updating database structures in a computing system, comprising:
at least one processor coupled to a memory, in which the at least one processor is configured:
to establish at least one database connection with a user;
to set a free resources parameter to initiate the release of database connections, wherein the free resources parameter corresponds to a dynamic system reconfiguration parameter;
to release the at least one database connection based on the free resources parameter by releasing the at least one database connection more rapidly when the free resources parameter is set than when the free resources parameter is not set, wherein the releasing of the at least one database connection occurs prior to the execution of an end thread command;
to update the database without shutting down the database after the at least one database connection is released and while the free resources parameter is set; and
to unset the free resources parameter after the database has been updated.

16. The computing system of claim 15, in which the at least one processor is further configured:
to discard database definitions corresponding to each of the at least one database connection when each of the at least one database connection is released.

17. The computing system of claim 15, in which the at least one processor is further configured to alter the database after each of at least one database connection is released.

18. The computing system of claim 15, in which the at least one processor is further configured to receive a request to access resources, wherein the request to access the resources is received through an interface comprising at least one of a JBOSS server, a Websphere server, a java database connector (JDBC), an object linking and embedding database (OLE/DB) connector, an open database connector (ODBC), an ActiveX Data Object for .NET (ADO.NET) connector, and a SPARQL connector.

19. The computing system of claim 18, in which the resources comprise at least one of a relational description table (RDT), a file relation description table (FRDT), and a file description table (FDT).

20. The computing system of claim 19, in which the at least one processor is further configured deregister the resources after at least one of a cursor, an explicit lock, a runtime packet, and a dropped table is cleared in the database.

* * * * *